(12) United States Patent
Matys et al.

(10) Patent No.: US 11,731,195 B2
(45) Date of Patent: Aug. 22, 2023

(54) METHOD AND APPARATUS FOR FEEDING MATERIAL INTO A PLASMA

(71) Applicant: 6K Inc., North Andover, MA (US)

(72) Inventors: Pawel Matys, Jupiter, FL (US); Michael Kozlowski, Reading, MA (US); Makhlouf Redjdal, Stoneham, MA (US); Joseph Robert Caruso, Reading, MA (US); Zongren Shang, Westborough, MA (US)

(73) Assignee: 6K Inc., North Andover, MA (US)

( * ) Notice: Subject to any disclaimer, the term of this patent is extended or adjusted under 35 U.S.C. 154(b) by 0 days.

(21) Appl. No.: 17/484,686

(22) Filed: Sep. 24, 2021

(65) Prior Publication Data

US 2022/0097131 A1  Mar. 31, 2022

Related U.S. Application Data

(60) Provisional application No. 63/083,204, filed on Sep. 25, 2020.

(51) Int. Cl.
*H05H 1/42* (2006.01)
*B22F 1/065* (2022.01)
*H05H 1/30* (2006.01)

(52) U.S. Cl.
CPC .............. *B22F 1/065* (2022.01); *H05H 1/30* (2013.01); *H05H 1/42* (2013.01)

(58) Field of Classification Search
None
See application file for complete search history.

(56) References Cited

U.S. PATENT DOCUMENTS

| 4,217,479 A * | 8/1980 | Borer ..................... C03B 5/025 |
| | | 422/906 |
| 4,627,990 A | 12/1986 | Saga et al. |
| 6,114,649 A * | 9/2000 | Delcea ..................... H05H 1/34 |
| | | 219/121.52 |
| 6,478,234 B1 | 11/2002 | Klein et al. |
| 7,115,832 B1 * | 10/2006 | Blankenship ............ H05H 1/42 |
| | | 219/121.48 |
| 8,748,785 B2 | 6/2014 | Jordan et al. |
| 10,477,665 B2 | 11/2019 | Hadidi et al. |
| 2008/0185366 A1 * | 8/2008 | Suslov ..................... H05H 1/34 |
| | | 219/121.47 |
| 2012/0298631 A1 | 11/2012 | Rat et al. |
| 2016/0237544 A1 | 8/2016 | Serra |
| 2017/0021372 A1 * | 1/2017 | Krenn ..................... B05B 7/226 |
| 2019/0001416 A1 | 1/2019 | Larouche et al. |
| 2019/0381564 A1 | 12/2019 | Barnes et al. |
| 2021/0187607 A1 | 6/2021 | Badwe et al. |

OTHER PUBLICATIONS

International Search Report and Written Opinion issued in International Application No. PCT/US2021/071591 dated Dec. 28, 2021.

* cited by examiner

*Primary Examiner* — George Wyszomierski
(74) *Attorney, Agent, or Firm* — Womble, Bond, Dickinson (US) LLP

(57) ABSTRACT

An apparatus for providing material feedstock into a plasma of a plasma torch includes a material feeding device having an input end and an output end. The output end of the material feeding device extends at least partially around the periphery of a plasma generated near the output end of the plasma torch. The material feeding device is oriented at an angle with respect to a central axis of the plasma torch.

11 Claims, 7 Drawing Sheets

METHOD AND APPARATUS FOR FEEDING MATERIAL INTO A PLASMA

RELATED APPLICATION

This application claims priority from and the benefit of U.S. Provisional Patent Application No. 63/083,204 filed on Sep. 25, 2020; the entire contents of which are incorporated herein by reference in their entirety.

FIELD OF THE INVENTION

The present technology generally relates to devices, systems, and methods for feeding material into a plasma for processing of the material by the plasma. In particular, the present technology relates to methods and apparatus for enabling a variety of material feeding techniques to increase throughput and increase plasma-feedstock coupling interaction, while also providing a variety of characteristics to the material from plasma processing.

BACKGROUND

Plasma torches provide a high temperature plasma for a variety of purposes. In general, there are several types of plasma torches including induction plasma torches and microwave plasma torches. Other types of plasma torches can include direct current (DC) plasma, with arcing between a cathode and anode. These types of plasma torches provide substantially different high temperatures, with microwave plasma reaching about 6,000 K and the rest reaching about 10,000 K.

These high temperature plasmas may enable processing of a variety of materials that are exposed to or fed into the plasma. One such type of processing is taking one or more materials of a particular size and shape and, by exposing or feeding it into the plasma, changing the one or more materials into a different size and/or shape.

For example, initial or feedstock materials typically are provided with a particular shape or a variety of shapes and a particular size or variety of sizes. Once exposed to or fed into the plasma, the initial feedstock materials may be processed or transformed by the high temperature plasma to be smaller in size, similar in shape, or both. However, one object of this operation is to spheroidize the material from irregular shapes to spheres.

SUMMARY

Provided herein are devices and methods for providing material feedstock into a plasma of a plasma torch. According to one aspect of the present disclosure, an apparatus for providing material feedstock into a plasma of a plasma torch is disclosed. The apparatus includes a material feeding device having an input end and an output end. The output end extends at least partially about a periphery of a plasma generated at or near an output end of a plasma torch. The material feeding device is oriented at an angle with respect to a central axis of the plasma torch. In some embodiments, the output end of the material feeding device includes a nozzle that has a flared cross sectional geometry extending at least partially about the periphery of the plasma to provide a substantially uniform dispersion of the material feedstock at least about a substantial portion of the entire periphery of the plasma. In some embodiments, the nozzle provides substantially uniform dispersion of the material feedstock around at least half of the periphery of the plasma at a particular position about the periphery of the plasma. In some embodiments, the output end of the material feeding device includes a number of nozzles positioned about the periphery of the plasma, and the number and cross sectional geometry of the nozzles are selected to provide a substantially uniform dispersion of the material feedstock around a substantial portion of the entire periphery of the plasma. In some embodiments, the material feeding device is designed to spread the material feedstock about the entire periphery of the plasma. In some embodiments, the material feeding device is adjustable with respect to the central axis of the plasma torch to enable feeding of the material feedstock at different positions along the length of the plasma. In some embodiments, the material feeding device feeds material about a substantial portion of the periphery of the plasma as well as a desired portion along the length of the plasma. In some embodiments, the angle of the material feeding device with respect to the central axis of the plasma torch can be adjusted. In some embodiments, the material feeding device is a conical hopper having the input end wider than the output end. In some embodiments, the plasma torch liner forms a gap between both the input end and the output end of the conical hopper, the gap between the plasma torch and the input end of the conical hopper being larger than the gap between the plasma torch liner and the output end of the conical hopper so that material can be fed into the larger gap and exit the smaller gap into the plasma about substantially the entire periphery of the plasma. In some embodiments, a portion of the plasma extends outside the confines of the output end of the conical hopper and the respective end of the plasma torch, and the material is fed about a periphery of this portion of the plasma directly from the smaller gap at the output end of the conical hopper. In some embodiments, the apparatus also includes a material swirl device positioned for operable communication with material in the conical hopper to assist in evenly distributing material within the conical hopper. In some embodiments, the material feedstock is fed into the plasma by gravity. In some embodiments, the material is fed into the plasma at a particular rate and velocity that does not appreciably disrupt the plasma and provides for uniform processing of the material by the plasma.

According to another aspect of the present disclosure, an apparatus for uniformly providing material feedstock into a plasma of a plasma torch is disclosed. The material feeding device is installed near a plasma within a plasma torch. The plasma has a three dimensional shape that varies slightly over time during operation, and has a desired and relatively consistent length, width, depth, shape and periphery. The material feeding device is in operable communication with a source of material to be fed into the plasma, and the material feeding device is also capable of transferring the material to the plasma at a desired dispersion pattern that can vary based on a variety of factors. The material feeding device is designed and installed to enable substantially uniform dispersion of the material into the plasma at a position along the length of the plasma, and at least about a substantial portion of the entire periphery of the plasma, despite the variability of the shape and position of the plasma to utilize substantially all energy of the plasma, decrease variability of the plasma itself caused by inputting material into the plasma, and decrease concentration of the material as it engages with and is processed by the plasma to provide for more efficient and consistent material processing to increase yield while avoiding additional processing to meet precise material specifications.

According to another aspect of the present disclosure, a method of processing materials within a plasma torch is disclosed. The method includes: a) providing a plasma torch having a plasma established therein, the plasma having a relatively consistent but dynamic three dimensional shape that varies slightly over time during operation and having a desired and relatively consistent length, width, depth, shape and periphery. The method also includes: b) providing a source of material to be fed into and processed by the plasma. The method also includes: c) providing a material feeding device near a desired position of the plasma, the material feeding device being in operable communication with the source of material to be fed into the plasma. The method also includes: d) transferring the material, using the material feeding device, to the plasma at a dispersion pattern that can vary based on a variety of factors, the material feeding device being designed and installed to enable substantially uniform dispersion of the material into the plasma at a position along the length of the plasma and at least about substantially the entire periphery of the plasma. In some embodiments, the method also includes: e) monitoring an output of the plasma to determine if a desired processing of the material has been provided by the plasma; f) adjusting the dispersion pattern of the material to the plasma if the desired processing of the material has not been achieved; and g) repeating operations d)-f) as needed until the desired processing of the material has been achieved. In some embodiments, adjusting the dispersion pattern of the material to the plasma includes adjusting at least one of: material feed rate, material velocity, and position of the material feeding device with respect to the plasma. In some embodiments, the material feed rate and material velocity are selected to provide a smooth flow of material within a material feeding device in operable communication with the plasma torch, and to prevent any agglomeration of material within the material feeding device. In some embodiments, the plasma is a microwave plasma having an interior temperature at least several times higher than an exterior temperature, and whereby power provided to the plasma only needs to be sufficient to enable the exterior temperature to provide the desired processing of the material so that any material that may make its way to the interior of the plasma is still processed as desired to provide the desired yield while conserving power and thus reducing costs.

BRIEF DESCRIPTION OF THE DRAWINGS

The invention may be more fully understood from the following detailed description taken in conjunction with the accompanying drawings.

DETAILED DESCRIPTION

Figure 1:
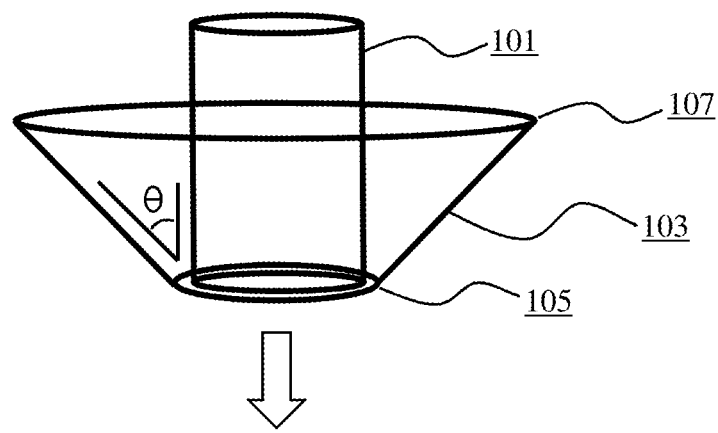
FIG. 1 is a side view of a conical material feeding device and plasma torch liner, according to one embodiment of the present disclosure.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present technology.

In general, aspects of the present technology are directed to devices, systems and methods relating to material feeding devices for plasma processing. In some embodiments, various materials can be processed using a plasma torch. For example, material particles can be introduced into a plasma and exposed to the extremely high temperatures present within the plasma. These temperatures can process the material particles and transform them into particles of different sizes or shapes, depending on the desired processing. The plasma can be a microwave generated plasma or induction generated plasma, in various embodiments.

The embodiments disclosed herein can provide one or more of the following advantages. In some embodiments, the distributed material feeding device can transfer material particles to the plasma at a desired dispersion pattern that can vary based on a variety of factors. The material feeding devices described herein can enable a substantially uniform dispersion pattern of the material particles into the plasma at a particular position along the length of the plasma, and around a substantial portion of the periphery of the plasma. In some cases, the uniform distribution can be achieved around the entire periphery of the plasma, despite variabilities of the shape and position of the plasma. This allows the system to utilize substantially the full energy of the plasma and decrease variability of the plasma itself caused by inputting material into the plasma. Attacking the plasma plume coaxially with this feeding system preserves the overall symmetry of the operations, and the plume disturbance is uniformly distributed around the plume.

The material feeding devices described herein can also decrease the concentration of the material (i.e. the number of particles per unit volume entering the circumference of the plasma plume) as it engages with and is processed by the plasma to provide for more efficient and consistent material processing. This concentration relates to how the powder is uniformly dispersed by the cone. In some embodiments, a feeding gas is used to drive the powder on the plane of the cone. Such embodiments can increase yield and reduce costs, while avoiding additional processing to meet precise material specifications.

Furthermore, the techniques disclosed herein provide for a recursive method of monitoring the output of the plasma torch and adjusting the dispersion pattern of the material particles entering the plasma in order to achieve desired processing results.

In some embodiments, to maximize processing of feedstock in a plasma, the feedstock should be well-dispersed in order to decrease the local material concentration. If the local material concentration is too high, some material may be under-processed for the specific plasma conditions.

Material processing is adversely affected when local feedstock concentration (in $g/cm^3$) (i.e. the number of the particles within the plasma) is too high. In this condition, the high concentration of the material lessens the available energy and saturates the process. One way to improve processing is to increase particle dispersion, or decrease the local feedstock concentration, so that there is enough energy present for successful processing. The injection schemes disclosed herein are techniques that decrease local material particle concentration within the plasma by dispersing the particles around the periphery of the plasma.

In some embodiments, different types of materials are processed at different temperatures. Therefore, it is desirable to control where along the length of the plasma the materials enter the plasma. In some embodiments of the present disclosure, the position of the material feeding device can be adjusted with respect to the plasma torch so that materials can be introduced into the plasma at different locations along the length of the plasma, and at different angles, if desired.

In some embodiments, the material feedstock particles could be of various morphologies such as angular powder, angular chips, irregular powder, sponge powders, spheroidal particles or powder, etc. The material can be processed prior to introduction into the plasma to meet certain criteria for size, gas content, purity contamination, and chemistry by processes such as grinding, milling, cleaning, washing, drying, screening, etc. The cleaning can include, for example, removing organic, ceramic, or metallic contaminants.

According to some embodiments, the material feeding device can include a conical hopper or conical material feeder that introduces particles around all or a significant portion of the circumference of the plasma, thereby utilizing the full plasma potential as well as minimizing local feedstock concentration. In some embodiments, the conical hopper can also serve as a plenum or buffer area so that the entire balance of feedstock material can be injected at a material input end, thus mitigating the need for any upstream material manifolds. In such an embodiment, the design challenges of providing multiple discrete material injectors with balanced flow can be removed.

According to some embodiments, the material feeding device can include a flared injector or nozzle that distributes material particles around a substantial portion of the periphery of the plasma. In contrast to a conical material feeder, the flared injector can spread feedstock laterally to decrease material concentration of the particles entering the plasma, while keeping feedstock within the operating thermal window (otherwise, process efficiency, such as the level of spheroidization, is reduced).

FIG. 1 is a side view of a conical material feeding device 103 disposed around a plasma torch liner 101, according to one embodiment of the present disclosure. In this embodiment, the conical material feeding device 103, or injector, is styled as a cone that surrounds the cylindrical plasma torch liner 101. The arrow in FIG. 1 illustrates the direction of the gas flowing through the plasma torch liner 101 from the first end of the torch to the second end of the torch, where the plasma plume is formed. In this embodiment, the inner surface of the conical material feeding device 103 is angled inward from the material input end 107 to the material output end 105, such that it is positioned at an angle θ with respect to the central axis of the cylindrical plasma torch liner 101.

In some embodiments, the angle θ between the conical material feeding device 103 and the cylindrical plasma torch liner 101 can be about 45°. In other embodiments, the angle θ can be between about 40° and 50°, between about 35° and 55°, between about 30° and 60°, between about 25° and 65°, between about 20° and 70°, between about 15° and 75°, between about 10° and 80°, or between about 5° and 85°. The angle of inclination between the material feeding device and the plasma torch can vary, in some embodiments, based on the desired angle of entry of the material particles.

Figure 2:
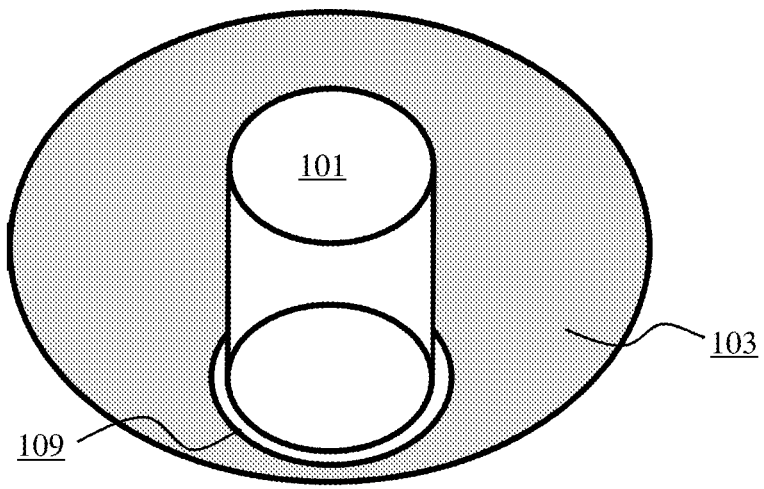
FIG. 2 is a perspective view of the conical material feeding device and plasma torch liner of FIG. 1, according to one embodiment of the present disclosure.

FIG. 2 is a perspective view of the conical material feeding device 103 of FIG. 1, according to one embodiment of the present disclosure. As shown in this embodiment, the conical material feeding device 103 is positioned around the cylindrical plasma torch liner 101, and there is a specific gap 109 defined between the outside of the cylindrical plasma torch liner 101 and the inner diameter of the cone at the narrowest end (the material output end 105 shown in FIG. 1). This gap 109 allows the material feedstock to flow out of the conical material feeding device 103 at a particular angle and into the plasma that is formed at the outlet of the plasma torch. In some embodiments, the gap 109 can vary depending on the material, among other factors.

Figure 3:
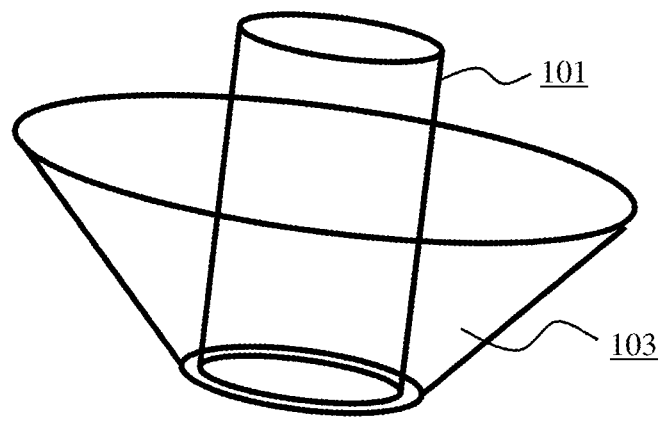
FIG. 3 is another perspective view of the conical material feeding device of FIG. 1, according to one embodiment of the present disclosure.

FIG. 3 is another perspective view of the conical material feeding device 103 of FIG. 1, according to one embodiment of the present disclosure. In this view, the conical material feeding device is slightly tilted off the vertical axis in order to further show an example spatial relationship between the conical material feeding device 103 and the plasma torch liner 101. By using a conical design for the material feeding device, material can be injected or introduced into the plasma around the entire circumference of the plasma flame, thereby utilizing the full energy source and minimizing material concentration. In some embodiments, the conical material feeding device 103 can also serve as a material distribution buffer. In other words, material can be injected or fed into the volume between the conical material feeding device 103 and the cylindrical plasma torch liner 101 and distributed by a swirling action, thereby avoiding the need for any upstream manifolding. In some embodiments, a material swirl device can include an airflow generator that can be positioned for operable communication with material in the conical portion of the feeding device. In some embodiments, the design can utilize gravity to introduce the material particles into the plasma, thereby lowering the injection velocity and potentially increasing residence time of the particles within the plasma, and therefore increasing processing time.

Figure 4:
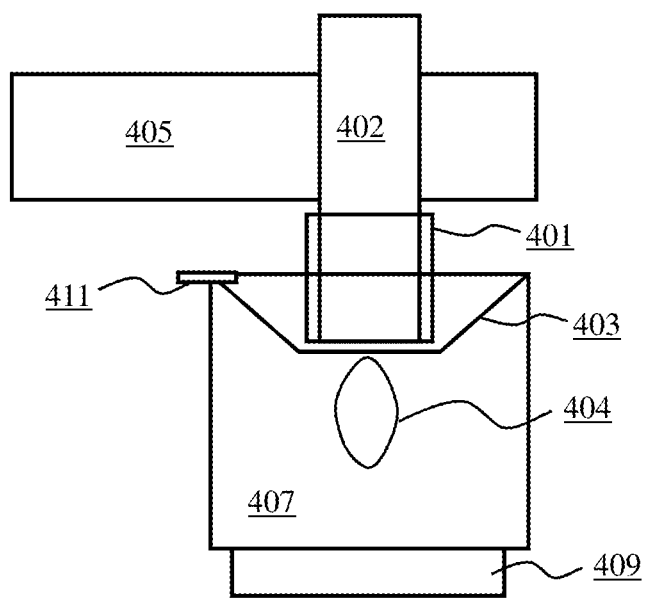
FIG. 4 is a cross sectional view of an example microwave plasma torch with a conical material feeding device, according to one embodiment of the present disclosure.

FIG. 4 is a cross sectional view of an example microwave plasma torch liner 401 with a conical material feeding device 403, according to one embodiment of the present disclosure. In this embodiment, a microwave plasma torch 402 is utilized, and the microwave radiation can be brought into the plasma torch 402 through a waveguide 405. The feed material can be fed into the plasma chamber 407 and placed into contact with the microwave generated plasma between the gap between the conical material feeding device 403 and the microwave plasma torch liner 401, as discussed above in reference to FIG. 2. In this example embodiment, a collection chamber or container 409 can be positioned at the output of the plasma chamber 407 in order to collect the processed particles after they have passed through the microwave generated plasma. In some embodiments, the microwave generated plasma may be generated using a microwave plasma torch, as described in U.S. Pat. Nos. 10,477,665, and/or 8,748,785, each of which is hereby incorporated by reference in its entirety.

In some embodiments, the microwave plasma has an interior temperature that is several times higher than its exterior temperature, and the power provided to the plasma only needs to be sufficient to enable the exterior temperature to provide the desired processing of the material so that any material that may make its way to the interior of the plasma is still processed as desired. This can provide the desired yield while conserving power and thus reducing costs. In some embodiments, an induction generated plasma has a higher temperature on the outside of the plasma, which can cause unique problems. Thus, the use of a microwave generated plasma can insure full processing, thereby increasing yield.

In some embodiments, a material swirl device 411 can be positioned in operable communication with the material within the conical material feeding device 403. In some embodiments, the material swirl device 411 can include an airflow generator that can be positioned to generate an air flow to prevent clumping of the particles within the conical material feeding device 403 and ensure a consistent particle feed rate. It is to be understood, however, that the number, type, and positioning of the material swirl device(s) 411 can vary.

In some embodiments, the conical material feeding device 403 can be mounted to the plasma chamber 407, or to a plasma torch housing. In some embodiments, the end or narrowest portion of the conical material feeding device 403 can coincide with or be flush with the output or second end of the plasma torch liner 401. In some embodiments, the position of the conical material feeding device 403 with respect to the plasma torch liner 401 can be adjusted vertically in order to introduce the material particles into the plasma plume 404 at the appropriate or desired location along the length of the plasma plume 404. The material particles can enter at the larger end of the conical material feeding device 403 and be distributed around the circumference of the plasma torch liner 401 by a swirling action (possibly assisted by the material swirl device 411). In some embodiments, a combination of carrier gas flow and gravity can push the material particles through the bottom gap between the conical material feeding device 403 and the plasma torch liner 401 and into the plasma plume 404. In some embodiments, the size of the gap between the conical material feeding device 403 and the plasma torch liner 401, the size of the material particles, the volume of material particles, and/or the angle of inclination of the conical material feeding device 403 can impact the speed and particle concentration of the particles entering the plasma. In this example embodiment, the plasma torch liner 401 includes a cylindrical sleeve that can at least partially surround a portion of the plasma torch 402. This can prevent the feedstock material from contacting the hot walls of the plasma torch 402, where it may coat the cylinder. The plasma torch liner 401 can have conical walls substantially parallel to the plasma torch 402 in order to contain the material within the plasma torch liner 401 and the conical material feeding device 403. Although this embodiment illustrates an example technique for positioning the conical material feeding device 403 with respect to the plasma torch liner 401, it is to be understood that various mounting structures or techniques can be used in order to position the feeding device at the desired location with respect to the plasma torch and the plasma.

In some embodiments, the various process parameters such as power density, feed rates, and residence time within the plasma can depend on the physical characteristics of the material particles, such as melting point and thermal conductivity, among other parameters. Examples of other such parameters can include particle size distribution, concentration of the material, etc.

Figure 5:
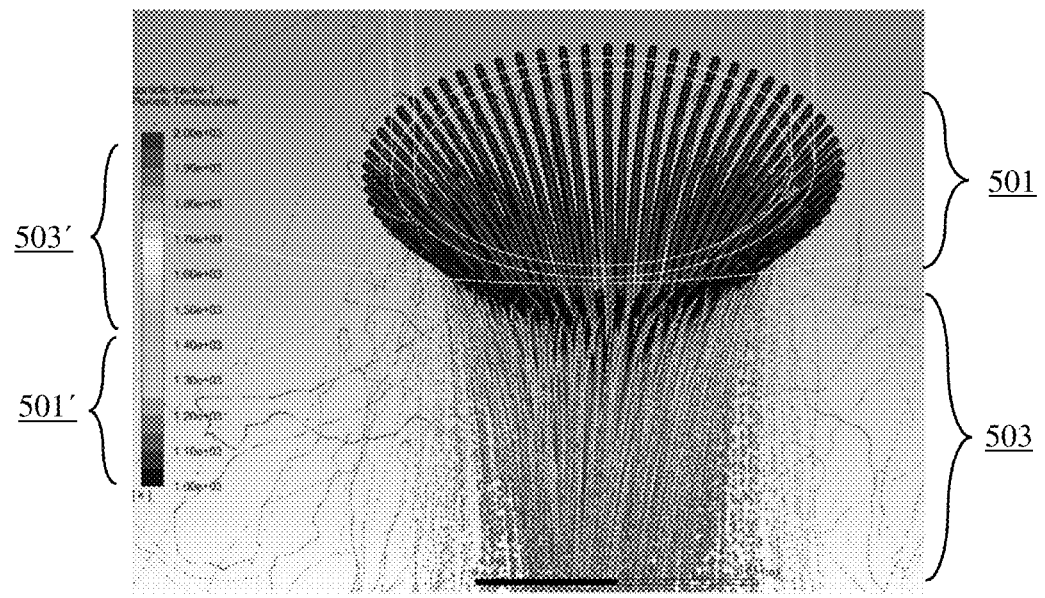
FIG. 5 is a graph of simulated particle temperatures in Kelvins (K) entering a plasma plume via a conical material feeding device, according to one embodiment of the present disclosure.

FIG. 5 is a graph of simulated particle temperatures entering a plasma plume via a conical material feeding device, according to one embodiment of the present disclosure. As can be seen in this embodiment, the material particles can be introduced around the entire periphery of the plasma in order to evenly distribute the particles around the entire plasma plume. This results in a more consistent temperature profile, where the particles in region 501 correspond to the temperature readings in region 501', and the particles in region 503 correspond to temperature readings in region 503'. In this specific embodiment, other than a few outlier particles, the vast majority of the particles enter the plasma and are exposed to a highly uniform temperature profile between about 1.75e+03 K and about 1.85e+03 K. As will be appreciated, variations in process parameters, including the power density, particle feed rates, particle residence time, positioning of the conical material feeding device with respect to the plasma torch, angle of inclination of the conical material feeding device, etc. can contribute to different temperature profiles within the plasma.

In some embodiments, the temperature profile of the particles can be substantially uniform, such that more than 95% of the particles entering the plasma are exposed to the same range of temperatures. In other embodiments, more than 99% of the particles, more than 97% of the particles, more than 90% of the particles, more than 85% of the particles, more than 80% of the particles, more than 75% of the particles, more than 70% of the particles, more than 65% of the particles, more than 60% of the particles, more than 55% of the particles, or more than 60% of the particles can be exposed to substantially the same range of temperatures within the plasma.

In some embodiments, the range of temperatures that the material particles are exposed to within the plasma can be between about 1.75e+03 K and about 1.85e+03 K, between about 1.70e+03 K and about 1.90e+03 K, between about 1.65e+03 K and about 1.95e+03 K. In some embodiments, the temperatures that the material particles are exposed to can be as high as 4,000 K, and the example ranges provided can depend on the particular system and the materials being processed.

Figure 6:
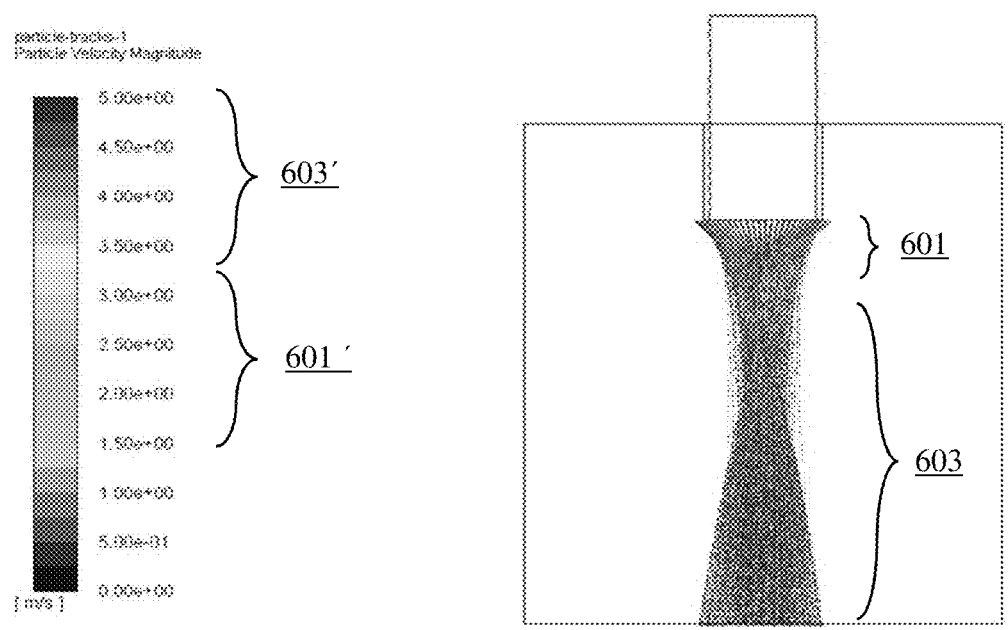
FIG. 6 is graph of simulated particle velocities entering a plasma plume via a conical material feeding device, according to one embodiment of the present disclosure.

FIG. 6 is a graph of simulated particle velocities entering a plasma plume via a conical material feeding device, according to one embodiment of the present disclosure. This image shows a side view of particle velocities, where the particles are introduced around the entire circumference of the plasma. In this embodiment, the particles in region 601 correspond to the particle velocities in region 601', while the particles in region 603 correspond to velocities in region 603'. In this embodiment, the vast majority of the particles are exposed to the plasma plume and have a substantially uniform velocity between about 4.00e+00 m/s and about 4.50e+00 m/s. In some embodiments, the particles can have a substantially uniform velocity between about 3.75e+00 m/s and about 4.4e+00 m/s, or between about 3.50e+00 m/s and about 5.00e+00 m/s.

As discussed above, the particle velocity directly impacts the particle residence time within the plasma, and therefore the processing time. Different processing times may be desired for different material particles, and various parameters can be adjusted in order to achieve the desired particle velocity and residence time. In some embodiments, particle velocity can affect more than the particle residence time, as particles may blow through the plasma or bounce off the plasma, depending on their velocity. In some embodiments, optimum parameters can be selected to ensure that the feedstock engages optimally with the plume so that the feedstock remains substantially co-linear with the plume after it penetrates it for maximum heat transfer from the plume to the particles, to achieve maximum processing.

In some embodiments, the particle velocity can be substantially uniform, such that more than 95% of the particles entering the plasma have the same range of particle velocities. In other embodiments, more than 99% of the particles, more than 97% of the particles, more than 90% of the particles, more than 85% of the particles, more than 80% of the particles, more than 75% of the particles, more than 70% of the particles, more than 65% of the particles, more than 60% of the particles, more than 55% of the particles, or more than 60% of the particles can have the same range of particle velocities.

Figure 7A:
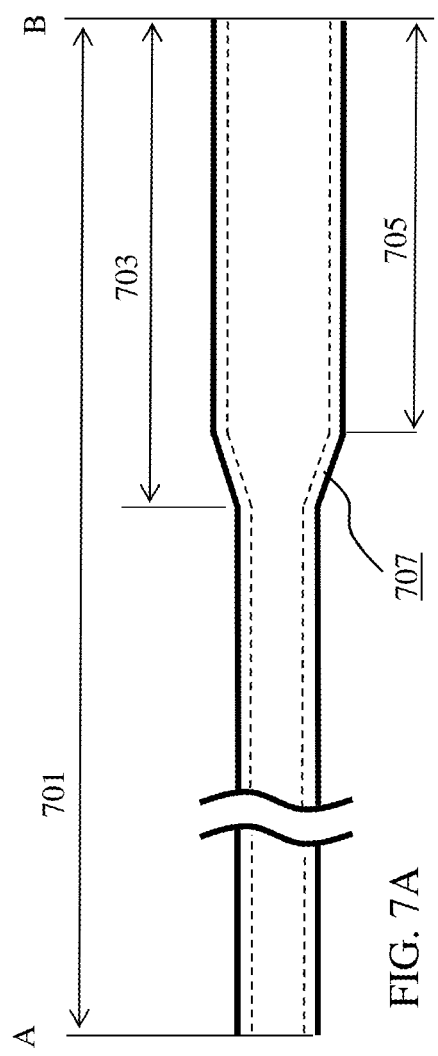
FIG. 7A is a plan view of a flared material feeding device, according to one embodiment of the present disclosure.

FIG. 7A is a plan view of a flared material feeding device 707, according to one embodiment of the present disclosure. The flow of particles can be through the flared material feeding device 707 from the end marked A to the end marked B. In this embodiment, the flared material feeding device 707 has a total length 701, a nozzle portion 703, and a flared ending 705. As will be appreciated, the taper geometry between the flared ending 705 and the beginning of the nozzle portion 703 can depend on the manufacturer and the particular implementations the flared material feeding device 707 is being used for. Instead of a continuous conical material injection around the entire circumference of the plasma, in this embodiment the flared ending 705 is positioned near the output end, or second end, of the plasma torch and widens in order to more evenly distribute particles laterally around the periphery or the circumference of the plasma. The positioning of the flared material feeding device 707 with respect to the plasma torch is described in more detail in the discussion of FIG. 8. This flared geometry spreads the particles out over a larger area of the plasma and around a greater proportion of the periphery of the plasma and leads to a decrease in feedstock concentration and an increase in uniform processing, provided that the flaring keeps the feedstock in the thermal operating area for optimum processing. In some embodiments, the nozzle width can vary, and the nozzle can be concave or have some other shape. In some embodiments, many nozzles can be used. The nozzles can be placed at 180 degrees, 90 degrees, or a delta configuration, away from each other around the circumference of the end of the plasma torch liner.

Figure 7B:
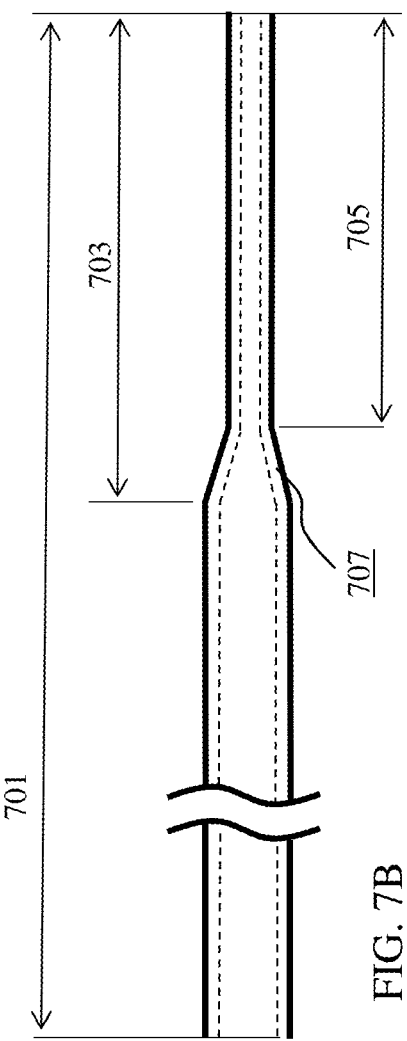
FIG. 7B is a side view of the flared material feeding device of FIG. 7A, according to one embodiment of the present disclosure.

FIG. 7B is a side view of the flared material feeding device 707 of FIG. 7A, according to one embodiment of the present disclosure. In this side view, it can be seen that the flared ending 705 has been shortened vertically, as compared to the remainder of the material feeding device, in addition to being flared or elongated laterally. In this particular embodiment, the combination of the vertically shortened and laterally flared geometry helps more evenly distribute the material particles exiting from the flared ending 705 in order to distribute particles around the periphery of the plasma. In some embodiments, this cross sectional reduction can impart additional desired velocity to the particles, in particular, with heavier materials.

In some embodiments, the total length 701 of the flared material feeding device can be around 18 inches (around 45.7 cm), while the nozzle portion 703 can have a length of about 4.25 inches (around 10.8 cm), and the flared ending 705 can have a length of about 3.25 inches (around 8.3 cm). In other embodiments, the geometries can be different depending on the particular application, the size of the material particles being used, the size of the plasma torch and/or plasma plume, etc. For example, the flared ending 705 can have a length of between about 1-4 cm, 1-5 cm, or even longer.

Figure 7C:
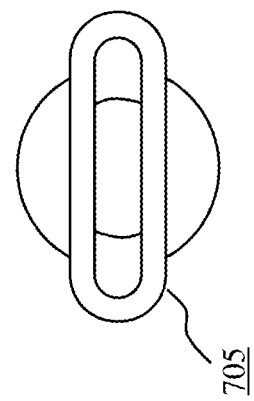
FIG. 7C is a front view facing into the flared end of the flared material feeding device of FIG. 7A, according to one embodiment of the present disclosure.

FIG. 7C is a front view facing into the flared ending 705 of the flared material feeding device of FIG. 7A, according to one embodiment of the present disclosure. In this particular embodiment, the laterally elongated or flared geometry of the flared ending 705 can be seen, as well as the shortened vertical geometry of the flared ending 705. In some embodiments, the flared ending 705 can have a flared lateral geometry that substantially matches all or a portion of the diameter of the plasma plume or the plasma torch. In other embodiments, the lateral length of the cross-sectional geometry of the flared ending 705 can be about 50%, 55%, 60%, 65%, 70%, 75%, 80%, 85%, 90%, 95%, or 100% of the diameter of the plasma torch or the plasma plume. It is to be understood that the geometry or shape of the flared ending 705 and the nozzle portion 703 can vary depending on a number of factors.

Figure 8:
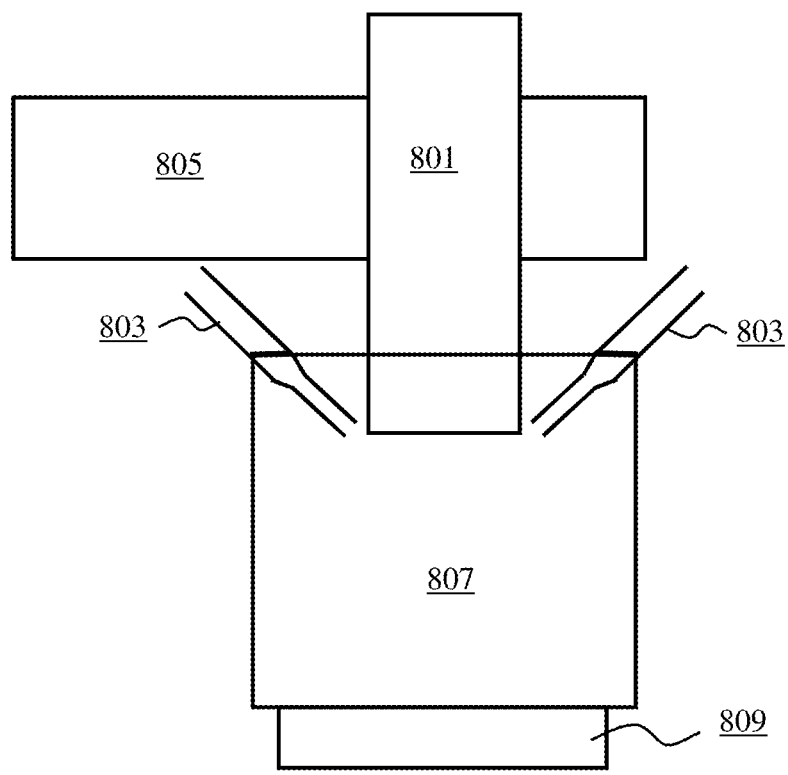
FIG. 8 is a cross sectional view of an example microwave plasma torch with two flared material feeding devices, according to one embodiment of the present disclosure.

FIG. 8 is a cross sectional view of an example microwave plasma torch 801 with two flared material feeding devices 803, according to one embodiment of the present disclosure. In this embodiment, a microwave plasma torch 801 is utilized, and the microwave radiation can be brought into the plasma torch 801 through a waveguide 805. The feed material can be fed into the plasma chamber 807 and placed into contact with the microwave generated plasma using the flared ending of a flared material feeding device, as discussed above in reference to FIGS. 7A-7C. In this example embodiment, a collection chamber or container 809 can be positioned at the output of the plasma chamber 807 in order to collect the processed particles after they have passed through the microwave generated plasma. Although this example shows two flared material feeding devices 803 having a particular shape, the number and shape of the nozzles of the feeding devices can vary.

In some embodiments, the flared material feeding devices 803 can be mounted to the plasma chamber 807, or to a plasma torch housing. In some embodiments, the flared ending of the flared material feeding devices 803 can coincide with or be flush with the output or second end of the plasma torch 801. In some embodiments, the position of the flared material feeding devices 803 with respect to the plasma torch 801 can be adjusted vertically in order to introduce the material particles into the plasma at the appropriate or desired location along the length of the plasma. The number of flared material feeding devices 803 being used, as well as their location around the periphery of the plasma torch 801 and their cross sectional geometry can also be customized in order to introduce two or more distributed particle flows into the plasma. In some embodiments, if a sufficient number of flared material feeding devices 803 are used at the proper positioning around the plasma and with the proper nozzle geometry, material particles can be introduced around substantially the entire periphery of the plasma. In this example embodiment, because FIG. 8 shows a side view of the flared material feeding devices 803, the flared ending of the feeding devices is shown to be narrower from the side, as described in reference to FIG. 7B. If viewed from above, the flared ending of the material feeding devices would be elongated to span all or a portion of the periphery of the plasma torch.

In some embodiments, a combination of carrier gas flow and gravity can push the material particles through the flared ending of the flared material feeding devices 803 and into the plasma. In some embodiments, the size of the gap between the flared material feeding devices 803 and the plasma torch 801, the size of the material particles, the volume of material particles, and/or the angle of inclination of the flared material feeding devices 803 can impact the speed and particle concentration of the particles entering the plasma.

In some embodiments, the various process parameters such as power density, feed rates, and residence time within the plasma can depend on the physical characteristics of the material particles, such as melting point, particle size, and thermal conductivity.

Figure 9A:
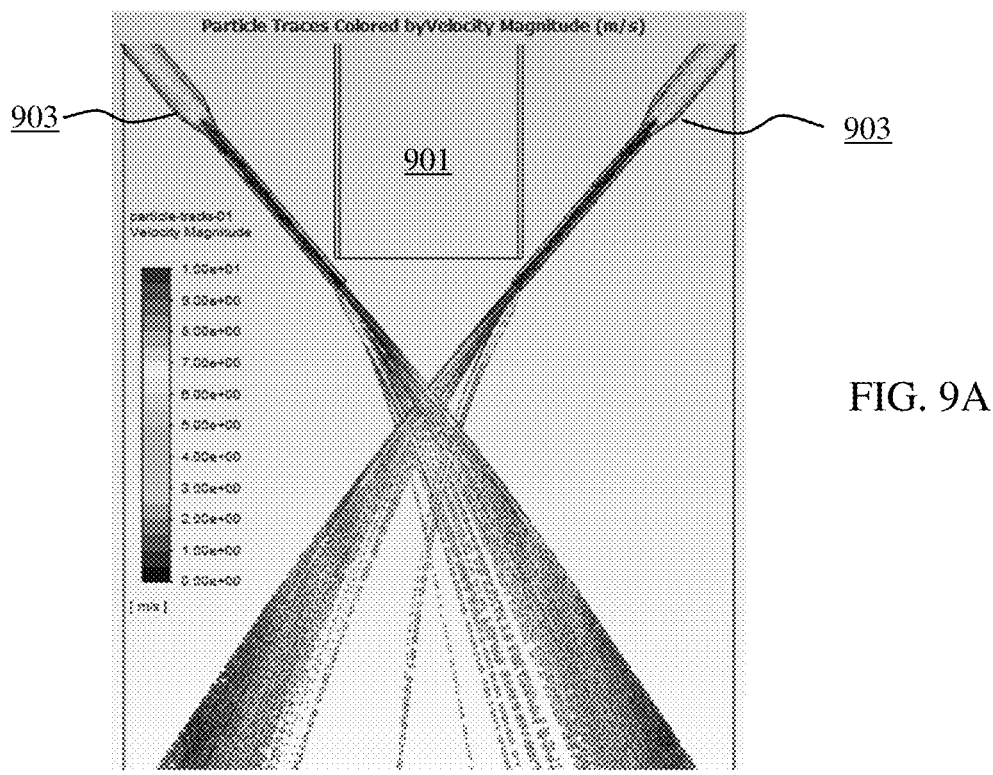
FIGS. 9A-9B show graphs of simulated particle velocities and temperatures entering a plasma plume via a pair of flared material feeding devices, according to one embodiment of the present disclosure.
Figure 9B:
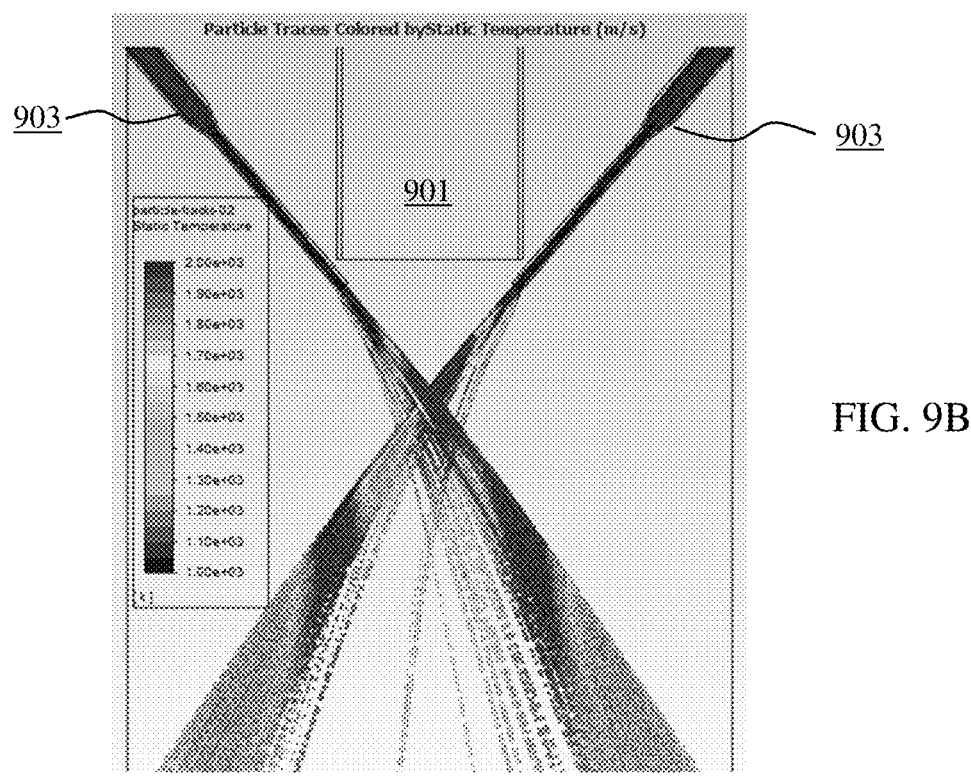

FIGS. 9A-9B show graphs of simulated particle velocities and temperatures entering a plasma plume via a pair of flared material feeding devices 903, according to one embodiment of the present disclosure.

The example embodiment in FIG. 9A shows a side view of a simulation showing particle velocity, where two streams of particles are introduced into a plasma via a pair of flared material feeding devices 903. In this embodiment, each of the two flared material feeding devices provides dispersion of particles around about half of the periphery of the plasma, which is located downstream of the mouth of the plasma torch 901. A majority of the particles have a substantially uniform velocity as they exit the pair of flared material feeding devices 903 and are exposed to the plasma plume. In this particular embodiment, the particles exiting the pair of flared material feeding devices 903 have a velocity magnitude in the range of about 4.00e+00 m/s to about 1.00e+01 m/s. In other embodiments, the particles exiting the pair of flared material feeding devices 903 can have a velocity magnitude in the range of about 5.00e+00 m/s to about 1.00e+01 m/s, about 5.00e+00 m/s to about 1.00e+01 m/s, about 6.00e+00 m/s to about 1.00e+01 m/s, about 7.00e+00 m/s to about 1.00e+01 m/s, about 8.00e+00 m/s to about 1.00e+01 m/s, or about 9.00e+00 m/s to about 1.00e+01 m/s. As discussed above, the particle velocity directly impacts the particle residence time within the plasma, and therefore the processing time. As compared to particles that are introduced into a plasma through a single non-flared or non-distributed nozzle, this embodiment provides a substantially more uniform velocity, and therefore more uniform processing time. Different processing times may be desired for different material particles, and various parameters can be adjusted in order to achieve the desired particle velocity and residence time.

In some embodiments, the particle velocity can be substantially uniform, such that more than 95% of the particles entering the plasma have the same range of particle velocities. In other embodiments, more than 99% of the particles, more than 97% of the particles, more than 90% of the particles, more than 85% of the particles, more than 80% of the particles, more than 75% of the particles, more than 70% of the particles, more than 65% of the particles, more than 60% of the particles, more than 55% of the particles, or more than 60% of the particles can have the same range of particle velocities.

The example embodiment in FIG. 9B shows a side view of a simulation showing particle temperature, where two streams of particles are introduced into a plasma via a pair of flared material feeding devices 903. As in the embodiment shown in FIG. 9A, each of the two flared material feeding devices provides dispersion of particles around about half of the periphery of the plasma, which is located downstream of the mouth of the plasma torch 901. A majority of the particles have a substantially uniform temperature profile as they exit the pair of flared material feeding devices 903 and are exposed to the plasma plume. In this particular embodiment, the particles exiting the pair of flared material feeding devices 903 and entering the plasma have a temperature in the range of about 1.40e+03 K to about 2.00e+03 K. In other embodiments, the particles entering the plasma from the pair of flared material feeding devices 903 can have a velocity magnitude in the range of about 1.50e+03 K to about 2.00e+03 K, about 1.60e+03 K to about 2.00e+03 K, about 1.70e+03 K to about 2.00e+03 K, about 1.80e+03 K to about 2.00e+03 K, or about 1.90e+03 K to about 2.00e+03 K. As compared to particles that are introduced into a plasma through a single non-flared or non-distributed nozzle, this embodiment provides a substantially more uniform temperature profile, and therefore more uniform processing. Different processing times may be desired for different material particles, and various parameters can be adjusted in order to achieve the desired particle velocity and residence time.

Figure 10:
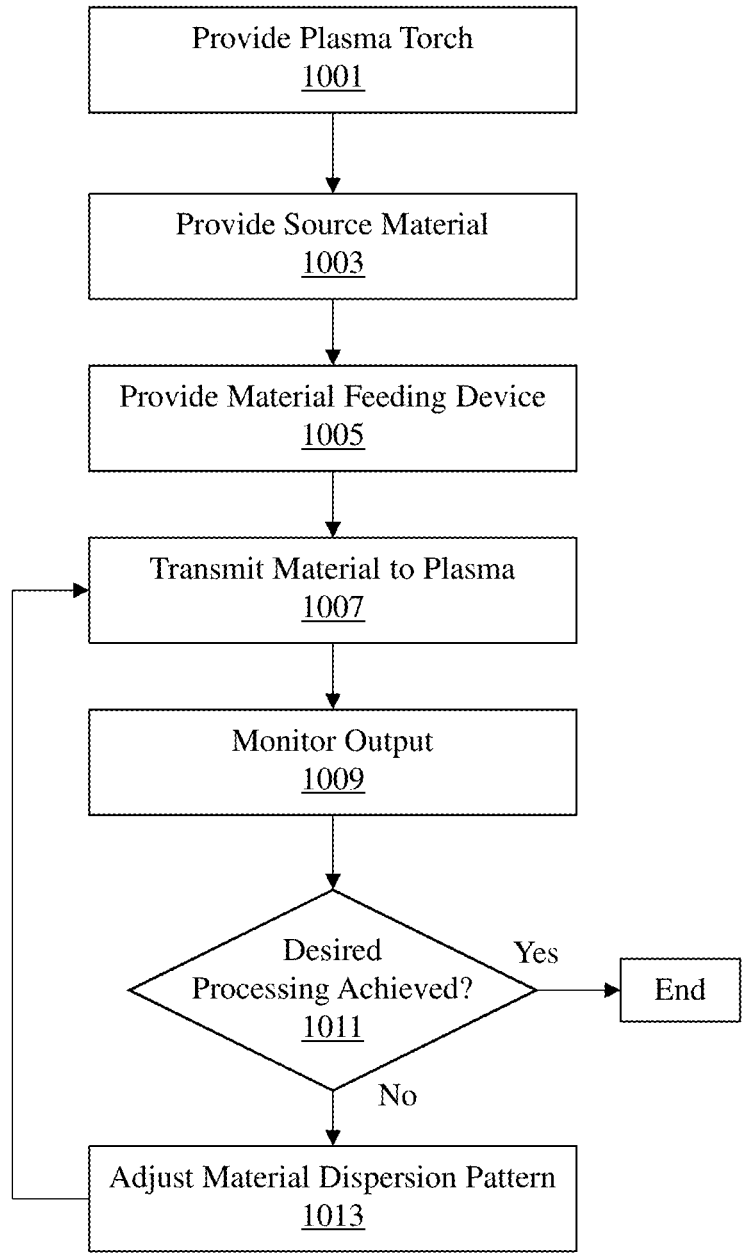
FIG. 10 is a flow chart illustrating a method of processing materials using a plasma torch, according to one embodiment of the present disclosure.

FIG. 10 is a flow chart illustrating a method of processing materials using a plasma torch, according to one embodiment of the present disclosure. In operation 1001, a plasma torch is provided. In some embodiments, the plasma torch is provided with a plasma established therein, and the plasma has a relatively consistent but dynamic three dimensional shape that can vary slightly over time during operation. The plasma can also have a desired and relatively consistent length, width, depth, shape, and periphery that all fall within acceptable predetermined ranges. In the discussion that follows, it is assumed that there is sufficient microwave power, i.e., optimum plume, to process the material feedstock. The delivery is an issue that is being solved by the different embodiments described herein to achieve optimum plasma plume and feedstock coupling for optimum processing.

In operation 1003, a source of material is provided to be fed into and processed by the plasma. In some embodiments, the material feedstock particles could be of various morphologies such as angular powder, angular chips, irregular powder, sponge powders, etc. As discussed above, the material can be processed prior to introduction into the plasma to meet certain criteria for size, gas content, purity contamination, and chemistry by processes such as grinding, milling, cleaning, washing, drying, screening, etc.

In operation 1005, a material feeding device is provided. In some embodiments, the material feeding device is designed, formed, and installed near a desired position of the plasma, and the material feeding device can be mounted to a plasma chamber, a housing, or some other structure of the system. The material feeding device is in operable communication with the source of material to be fed into the plasma, and the material feeding device is designed to transfer the material to the plasma at a desired dispersion pattern that can vary based on a variety of factors. In some embodiments, the material feeding device is designed and installed to enable substantially uniform dispersion of the material into the plasma at a position along the length of the plasma and around at least a portion of the periphery of the plasma, despite the variability of the shape and position of the plasma. In such an embodiment, the uniform dispersion of material particles around the periphery of the plasma utilizes substantially the full energy of the plasma, decreases variability of the plasma itself caused by inputting material into the plasma, and decreases the concentration of the material as it engages with and is processed by the plasma. Such embodiments can provide a more efficient and consistent material processing to increase yield and reduce costs, while avoiding any additional processing to meet precise material specifications. As discussed above, the material feeding device can include, as a subsequent step in communication with the plasma plume, for example, a conical material feeding device or one or more flared material feeding devices.

In operation 1007, material is transmitted or transferred to the plasma using the material feeding device. In some embodiments, the material feeding device is controlled or adjusted in order to transmit material to the plasma at a desired dispersion pattern to enable substantially uniform dispersion of the material into the plasma at a specific position along the length of the plasma. In some embodiments, a material swirl device can assist in transmitting the material from the material feeding device to the plasma. Such a material swirl device can be positioned for operable communication with material in the feeding device, and can assist in evenly distributing the material around the periphery of the plasma. In some embodiments, the material is fed from the material feeding device into the plasma by gravity. In some embodiments, the material is fed into the plasma at a particular rate and velocity that does not appreciably disrupt the plasma and provides for substantially uniform processing of the material by the plasma.

In some embodiments, the method can conclude at operation 1007 and the materials can be collected. In alternative embodiments, the method can continue at operation 1009 with monitoring the output of the plasma to determine if the desired processing of the material has been produced by the plasma. If it is determined in operation 1011 that the desired processing has been achieved, then the method can end.

If the desired processing has not been achieved, the method can continue at operation 1013 with adjusting a dispersion pattern of the material flow to the plasma. In some embodiments, the dispersion pattern is adjusted by adjusting the material feed rate, material velocity, or the position of the material feeding device with respect to the plasma. The position of the material feeding device can be adjusted vertically, or the angle between the material feeding device and the plasma torch can also be adjusted in order to enable feeding of the material into different positions along the length of the plasma and at different angles of approach. In some embodiments, the material feed rate and material velocity are selected to provide a smooth flow of material within the material feeding device and prevent any agglomeration of material within the material feeding device. Once the dispersion pattern of the material has been adjusted in operation 1013, the method returns to operation 1007 and repeats until the desired processing is achieved and the method ends.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

The invention claimed is:

1. An apparatus for providing material feedstock into a plasma of a plasma torch, comprising:
   a material feeding device having an input end and an output end, the output end extending at least partially about a periphery of a plasma generated proximal to an output end of a plasma torch, the material feeding device being oriented at an angle with respect to a central axis of the plasma torch; and
   wherein the material feeding device at least partially surrounds a plasma torch liner of the plasma torch such that a gap exists between the plasma torch liner and the material feeding device;
   wherein, during use, a portion of the plasma extends outside the confines of the output end of the material feeding device and the output end of the plasma torch, and wherein, during use, the material feedstock exits the material feeding device between the output end of the material feeding device and the plasma torch liner and enters the portion of the plasma.

2. The apparatus of claim 1, wherein the material feeding device is configured to spread the material feedstock about the entire periphery of the plasma.

3. The apparatus of claim 1, wherein the material feeding device is adjustable with respect to the central axis of the plasma torch to enable feeding of the material feedstock at different positions along the length of the plasma.

4. The apparatus of claim 3, wherein the material feeding device feeds material about a substantial portion of the periphery of the plasma as well as a selected location along the length of the plasma.

5. The apparatus of claim 1, wherein the angle of the material feeding device with respect to the central axis of the plasma torch is adjustable.

6. The apparatus of claim 1, wherein the material feeding device is a conical hopper having the input end wider than the output end.

7. The apparatus of claim 6, wherein the plasma torch liner forms a gap between both the input end and the output end of the conical hopper, the gap between the plasma torch liner and the input end of the conical hopper being larger than the gap between the plasma torch liner and the output end of the conical hopper so that material is fed into the larger gap and exits the smaller gap into the plasma about substantially the entire periphery of the plasma.

8. The apparatus of claim 7, wherein the material being fed about a periphery of the plasma enters the plasma through the smaller gap at the output end of the conical hopper.

9. The apparatus of claim 7, further comprising:
   a material swirl device positioned for operable communication with material in the conical hopper to assist in evenly distributing material within the conical hopper.

10. The apparatus of claim 1, wherein at least a portion of the material feeding device is positioned above the output end of the plasma torch such that the material feedstock is fed into the plasma by gravity.

11. An apparatus for uniformly providing material feedstock into a plasma of a plasma torch, comprising:

a material feeding device installed proximate a plasma within a plasma torch, the plasma having a three dimensional shape that varies slightly over time during operation and having a consistent length, width, depth, shape and periphery, the material feeding device being in operable communication with a source of material to be fed into the plasma, the material feeding device at least partially surrounding a plasma torch liner of the plasma torch such that a gap exists between the plasma torch liner and the material feeding device and the material feeding device also being capable of transferring the material to the plasma in a predetermined dispersion pattern, the material feeding device being designed and installed to enable substantially uniform dispersion of the material into the plasma at a position along the length of the plasma outside the confines of an output end of the material feeding device and an output end of the plasma torch and at least about a substantial portion of the entire periphery of the plasma to utilize substantially all energy of the plasma.

* * * * *